Aug. 9, 1960 P. F. HERRMANN 2,948,173
HAND TOOL WITH ADJUSTABLE TORQUE RELEASE
Filed April 15, 1959 2 Sheets-Sheet 1
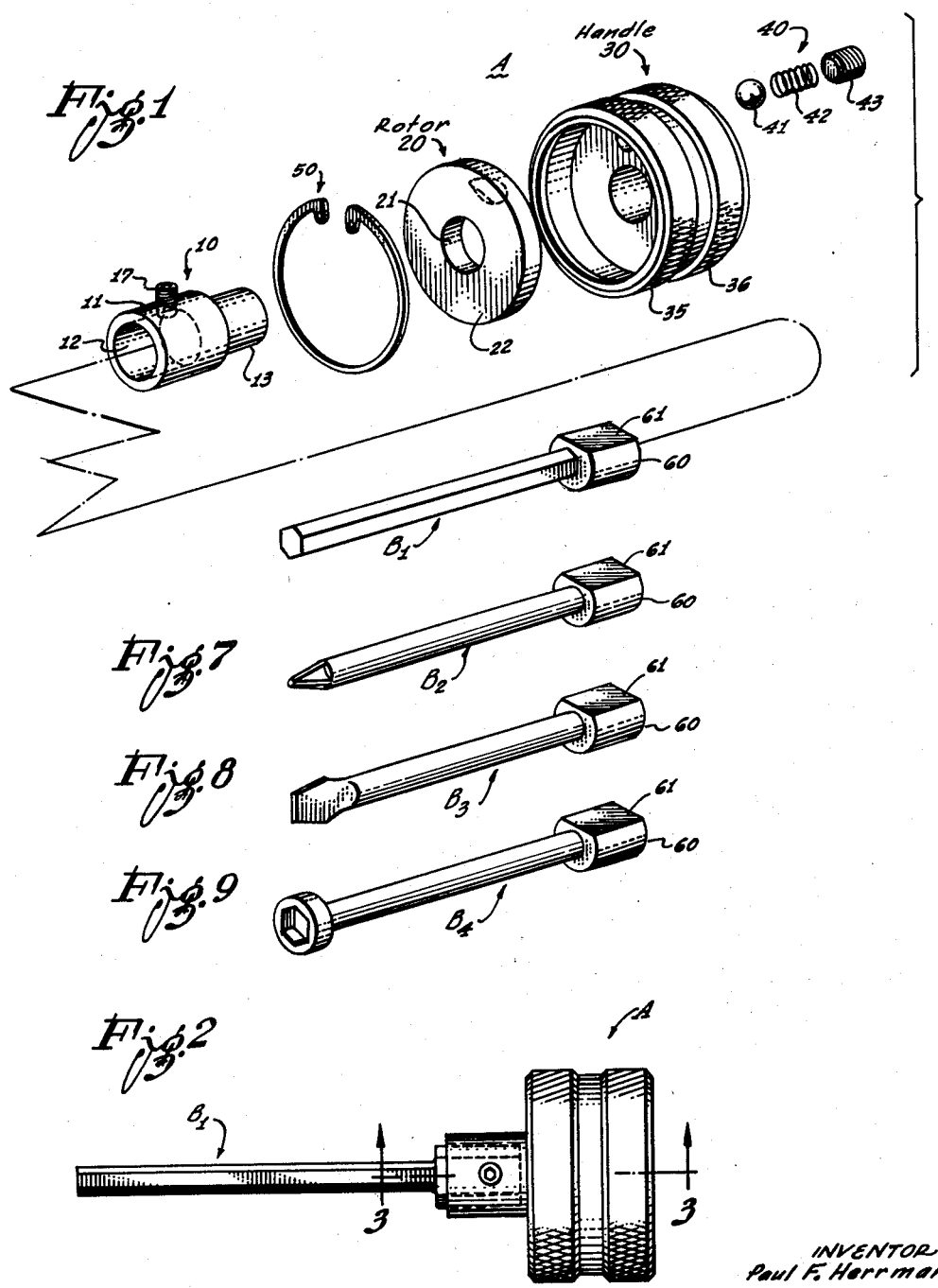
INVENTOR:
Paul F. Herrmann
By Gene W. Arant
Attorney.

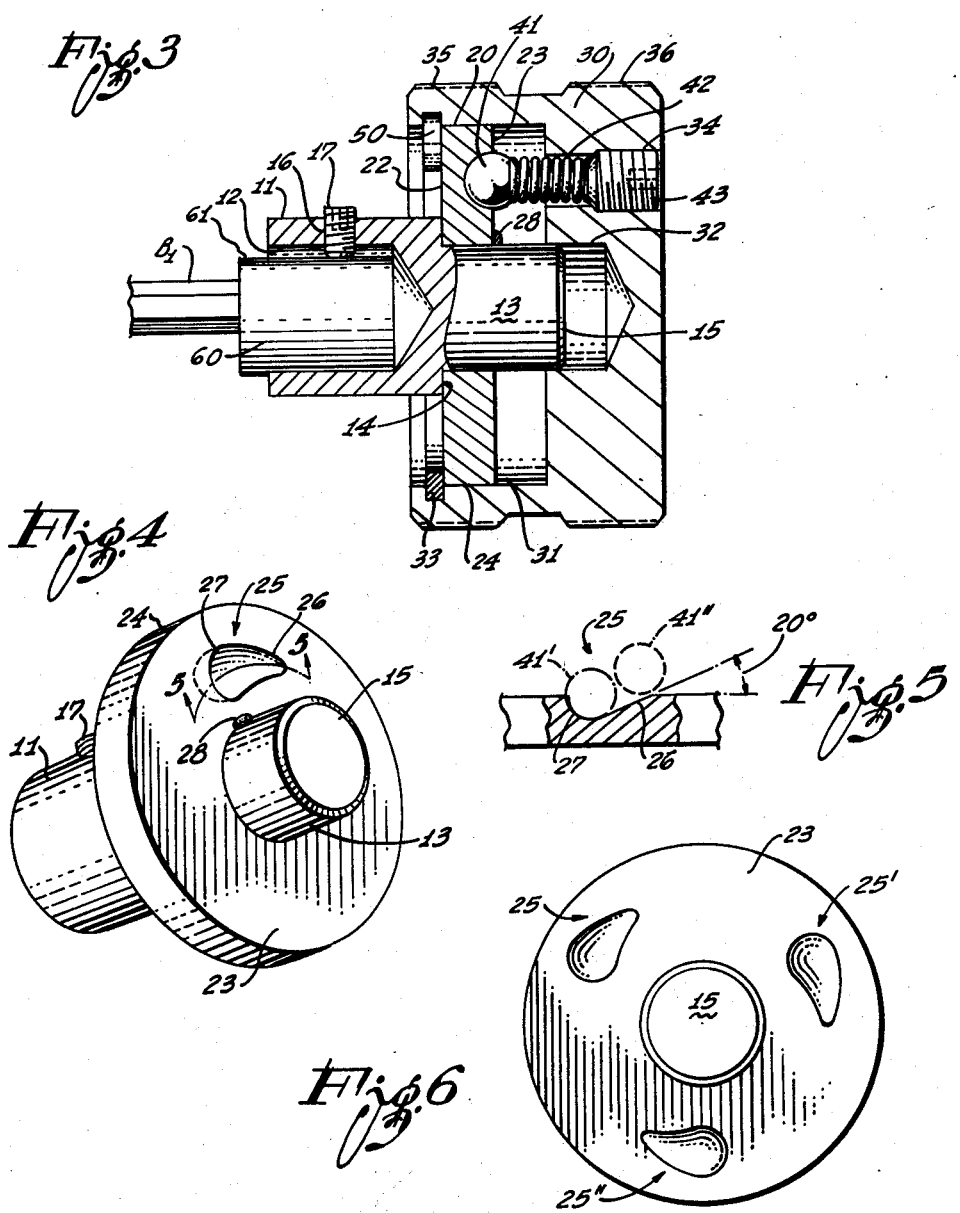

United States Patent Office 2,948,173
Patented Aug. 9, 1960

2,948,173

HAND TOOL WITH ADJUSTABLE TORQUE RELEASE

Paul F. Herrmann, Lakewood, Calif.
(15942 Minnesota Ave., Paramount, Calif.)

Filed Apr. 15, 1959, Ser. No. 806,711

3 Claims. (Cl. 81—52.4)

The present invention relates to a hand tool holder for a rotary tool, which is adapted to impart to the tool only a limited, predetermined amount of driving torque.

Many hand tools such as screw drivers, socket wrenches and the like, are adapted for rotary operation. Tools of this type typically have an elongated shank, an operating head at the forward end of the shank, and a base portion at the other end of the shank which is adapted to be removably attached to an operating handle. Tools of this type are commonly used in assembly line operations, for example, where machined screws or bolts are utilized for insertion into machined threaded openings in order to hold two or more parts of the apparatus together. In the electronics industry, for example, small assemblies having many precision parts are extensively used, and it is here that the present invention finds one of its most fertile fields of application.

A common problem in such assembly operations is that too much driving force is applied to the tool, with resulting damage to the assembly that is being worked on. Sometimes the socket or slot in the head of the screw, or the nut on the head of the bolt, will become damaged so that it cannot thereafter be properly grasped by the operating head of the tool. In other instances the thread on the body of the screw or bolt becomes stripped. A third type of damage which can occur is that the threads of the threaded opening into which the screw or bolt is being inserted may become stripped. This latter type of damage is particularly apt to occur, for example, where metal screws or bolts are being inserted into plastic materials.

Regardless of which of the three types of damage occurs, it may become either difficult or impossible to proceed with the assembly operation in the intended manner. Removal of damaged screws or bolts from counter sunk holes is a very difficult task, and the replacement of major assembly parts from which the threads have been stripped may not be difficult but is certainly expensive.

According to the present invention the problem is solved simply by limiting the amount of driving torque applied to the tool.

An object of the invention, therefore, is to provide a tool holder for a rotary tool, which will impart only a limited and predetermined amount of driving torque to the rotary tool.

Another object of the invention is to provide a tool holder for rotary tools, having adjustable means for controlling the amount of driving torque which will be imparted by the holder to the tool.

A further object of the invention is to provide a hand tool holder for rotary tools which is small, compact, reliable in operation, and inexpensive to manufacture.

The foregoing and other objects of the invention will become more readily apparent from the following description considered in conjunction with the accompanying drawings, in which:

Figure 1 is an exploded perspective view of the invention;

Figure 2 is a side view of the invention with a rotary tool attached;

Figure 3 is a longitudinal cross-sectional view of the invention taken on the line 3—3 of Figure 2;

Figure 4 is a perspective view of the tool-holding member which forms part of the invention;

Figure 5 is a fragmentary cross-sectional view of the tool-holding member taken on the line 5—5 of Figure 4;

Figure 6 is a plan view of an alternate form of rotor adapted for incorporation into the tool-holding member of Figure 4; and Figures 7, 8 and 9 illustrate other rotary tools which may be used with the invention.

Referring now to the drawings and more particularly to Figure 1, it will be seen that the invention includes a socket member 10 carrying a set screw 17, a rotor 20, a handle member 30, adjustable linkage means 40 for varying the torque levels at which rotation of the handle member is imparted to the rotor 20, and a retaining ring 50.

Various types of tools may be used with the invention, such as a socket screw driver B-1, a Phillips screw driver B-2, a conventional screw driver B-3, or a socket wrench B-4, all as illustrated in Figure 1. Each of the rotary tools is illustrated as having a cylindrical base portion 60 with a flattened surface 61 adapted to be engaged by the set screw 17.

While parts 10 and 20 are shown as two separate parts, it will nevertheless be understood that they could be integrally formed as one piece, which in the ensuing description will be referred to as the tool-holding member 10—20.

Deferring at the moment any further discussion of the function of the rotary tool or of the retaining ring 50, the basic features of the invention will now be summarized.

The tool-holding member 10—20 has a cylindrical opening 12 formed in one end 11 thereof. A threaded opening 16 is formed in a side wall of the end portion 11, in communication with cylindrical opening 12. Tool-holding member 10—20 carries on its other end a pair of longitudinally spaced cylindrical bearing surfaces 13 and 24, which are coaxially aligned with the cylindrical opening 12.

Handle member 30 is adapted to rotatably support the tool holding member 10—20 by simultaneously engaging both of the bearing surfaces 13, 24. More specifically, handle member 30 engages the bearing surface 13 at 32, and bearing surface 24 at 31.

The purpose of drive means 40 is to selectively impart rotation, or torque, of handle member 30 to the tool-holding member 10—20, all in accordance with the invention. Included in the adjustable linkage means 40 is a spring 42 which is supported in relatively fixed position by the handle member 30. Spring 42 has an outwardly projecting end which carries a ball 41 which is in turn adapted for rolling engagement with a rotating surface portion of the tool-holding member 10—20, during relative rotation between the handle member 30 and the tool-holding member 10—20.

The relative rotation is restricted and controlled, however, by means of a surface indentation 25 which is provided in the tool-holding member 10—20, and more specifically in one surface 23 of the rotor member 20. Indentation 25 has an inclined slope 26 up which the ball 41 rolls against the force of spring 42 when the driving torque applied to handle member 30 exceeds a predetermined magnitude. On its opposite side, indentation 25 has a substantially steeper slope 27 over which the ball 41 rolls only when the driving torque generated by rotation of handle member 30 in the opposite direction is of a substantially greater magnitude.

In operation, the ball 41 normally remains seated in the indentation 25 so as to lock handle member 30 and tool-holding member 10—20 together. However, as a screw or bolt is driven into place, an increasingly greater amount of driving torque is required. The pressure exerted by spring 42 on ball 41, and the angle of slope of the inclined end 26 of indentation 25, are such that when a predetermined level of driving torque is reached, the ball 41 will no longer remain seated in the indentation 25. Consequently, ball 41 rolls up the slope 26, as shown by the two alternative positions of the ball indicated at 41' and 41'' in Figure 5. Thereafter, handle member 30 rotates one complete revolution before ball 41 again becomes seated in indentation 25.

When a screw or bolt is being removed, it is desired to avoid any relative slippage between the handle member 30 and the tool-holding member 10—20. Therefore, the opposite slope 27 of indentation 25 is of such steepness and shape as to strongly retain ball 41 in place despite a heavy reversing torque. Thus it will be seen that my invention is so designed that the reversing torque available for removing a screw or bolt is substantially greater than the forward driving torque which may be imparted by the tool for the purpose of inserting the screw or bolt into the assembly in the first instance.

The structure and operation of the invention having thus been generally described, it only remains to consider the structural details of the preferred form of the invention illustrated in Figures 1 to 5 of the drawings, and also alternative forms of the invention, including the one illustrated in Figure 6 of the drawings.

Tool-holding member 10—20 as illustrated includes the socket member 10 and rotor member 20. The end portion 11 of socket member 10 is substantially cylindrical in shape and has a substantially uniform wall thickness around the circumference of the cylindrical opening 12. At its other end, the socket member 10 has a solid cylindrical shank 13 which is about the same diameter as cylindrical opening 12. Rotor member 20 has a flat-sided circular configuration with a concentric bore 21 therethrough, whose diameter is such as to be fitted over the shank 13. Rotor 20 is disposed at the end of shank 13, abutting against the end of cylinder 11, and is non-rotatably secured to shank 13 by means of silver solder brazing at 28 (Figure 4). The shank 13 is substantially greater in length than the thickness of rotor 20, hence the outer circumferential edge 24 of rotor 20, and the projecting end of shank 13, provide a pair of longitudinally spaced cylindrical bearing surfaces, from which the tool-holding member is supported.

Handle member 30 is substantially cup-shaped in configuration with a parallel pair of knurled bands 35, 36 around its outer surface to facilitate manual gripping thereof. Large cylindrical bore 31 extends about half the length of the member, leaving a thick base portion, and a smaller concentric bore 32 is counter sunk to a depth of about half of the base portion. The diameters of bores 31 and 32 are such as to accommodate the rotor member 20 and cylindrical shank 13, respectively. A smaller bore 34 extends through the base portion of member 30 into cavity 31, and is aligned parallel with the bore 32 but displaced a substantial distance off-center therefrom. The outer end of bore 34 is threaded, and carries an adjusting screw 43. Helical spring 42 of the adjustable linkage means 40 occupies the inner end of bore 34, in engagement with the adjusting screw 43, and also extends a substantial distance into the cavity 31. Ball 41 is supported from the projecting end of spring 42, and may occupy a portion of cavity 31 in rolling engagement with flat circular surface 23 of rotor member 20, but normally partially occupies the indentation 25 as illustrated in Figure 3.

Near the outer end of bore 31, a slot 33 is formed around the entire periphery thereof, into which retaining ring 50 is inserted. Retaining ring 50 thus secures the tool-holding member 10—20 against sliding longitudinally out of its supporting engagement with the handle member 30.

Although a single indentation 25 is sufficient to accomplish the purposes of the invention, it might nevertheless be preferred to provide a plurality of such indentations. Figure 6 illustrates an alternative form for rotor 20 having three separate indentations 25, 25' and 25'', all three of the indentations lie at the same radius distance from the center of the rotor member. Also, all three of the indentations have their inclined slope portion on that side of the indentation corresponding to a clockwise direction of rotation, while the steep slope is on the side corresponding to the counter-clockwise direction of rotation.

Other modifications of the invention will be readily apparent to those skilled in the art, and I do not intend to be limited to the details specifically shown and described herein except to the extent defined in the following claims:

I claim:

1. A predetermined torque release hand tool comprising: a tool-holding member having a shank with a pair of longitudinally spaced coaxially aligned cylindrical bearing surfaces formed thereon; a handle member adapted to rotatably support said tool-holding member in simultaneous engagement with both of said bearing surfaces; and adjustable linkage means for selectively imparting rotation of said handle member to said tool-holding member, said adjustable linkage means including a spring supported by said handle member in relatively fixed position with respect thereto, a ball carried by one end of said spring for rolling engagement with a rotating surface portion of said tool-holding member, and manually operable means for adjusting the pressure exerted on said ball by said spring; said tool-holding member having formed in said rotating surface portion thereof an indentation adapted to restrain said ball, one side of said indentation having an inclined slope up which said ball rolls against the force of said spring when the driving torque applied to said handle member exceeds a pre-determined magnitude, the other side of said indentation having a substantially steeper slope over which said ball rolls only when the reverse driving torque is of substantially greater magnitude.

2. A predetermined torque release hand tool comprising: a tool-holding member having a cylindrical opening in one end thereof, a threaded opening formed in a side wall of said one end in communication with said cylindrical opening, and a shank on the other end thereof providing a pair of longitudinally spaced cylindrical bearing surfaces in coaxial alignment with said cylindrical opening; a set-screw carried by said threaded opening for non-rotatably securing a tool shank within said cylindrical opening; a handle member adapted to rotatably support said tool-holding member in simultaneous engagement with both of said bearing surfaces; and adjustable linkage means for selectively imparting rotation of said handle member to said tool-holding member, said adjustable linkage means including a helical spring supported by said handle member in relatively fixed position with respect thereto, a ball carried by one end of said spring for rolling engagement with a rotating surface portion of said tool-holding member, and manually operable means for adjusting the pressure exerted on said ball by said spring; said tool-holding member having formed in said rotating surface portion thereof an indentation adapted to restrain said ball, one side of said indentation having an inclined slope up which said ball rolls against the force of said spring when the driving torque applied to said handle member exceeds a predetermined magnitude, the other side of said indentation having a substantially steeper slope over which said ball rolls when the reverse driving torque is of substantially greater magnitude.

3. A predetermined torque release hand tool comprising: a first rigid member having an elongated base portion with a cylindrical opening therein, a cylindrical shank of lesser diameter than said base portion and extending outwardly therefrom in coaxial alignment with said cylindrical opening, and a transverse threaded opening in a side wall of said base portion; a set screw carried by said threaded opening for non-rotatably securing the bushing of a rotary tool within said cylindrical opening; a flat-sided circular, rigid rotor member having a concentric cylindrical bore therethrough, disposed upon said shank immediately adjacent said base portion of said first rigid member and non-rotatably secured thereto; a second rigid member having a first cylindrical bore therein adapted to rotatably receive said rotor member, a second coaxially aligned cylindrical bore countersunk at the bottom of said first cylindrical bore and adapted to rotatably receive said cylindrical shank, and having an eccentrically disposed, longitudinal bore through its end portion at the bottom of said countersunk bore, the outer end of said eccentric bore being threaded; an adjustment screw disposed in the outer end of said eccentric bore; a helical spring disposed within the inner end of said eccentric bore and extending into the bottom portion of said countersunk bore parallel to said shank; means retaining said rotor and said shank within said second rigid member in fixed longitudinal position with respect thereto; and adjustable linkage means operatively coupling said second rigid member to said first rigid member including said helical spring and a ball carried on the projecting end thereof for engaging the transverse surface of said rotor member, said rotor surface having an indentation therein adapted to partially receive said ball and from which said ball can roll out against the force of said spring for one direction of rotation of said second rigid member when a predetermined driving torque is applied, but from which said ball cannot roll out against the force of said spring for the other direction of rotation of said second rigid member when a substantially greater driving torque is applied.

References Cited in the file of this patent

UNITED STATES PATENTS

| | | |
|---|---|---|
| 2,157,574 | Siesel | May 9, 1939 |
| 2,729,134 | Stanton et al. | Jan. 3, 1956 |
| 2,786,377 | Riess | Mar. 26, 1957 |
| 2,797,564 | Bonneau et al. | July 2, 1957 |
| 2,820,381 | White | Jan. 21, 1958 |
| 2,826,107 | Woods | Mar. 11, 1958 |
| 2,881,602 | Baker et al. | Apr. 14, 1959 |
| 2,885,918 | Allimann | May 12, 1959 |